Feb. 26, 1952     W. M. SPRENG     2,587,240
APPARATUS FOR SPRAYING

Filed Dec. 16, 1948     4 Sheets-Sheet 1

INVENTOR
WARREN M. SPRENG
By Toulmin & Toulmin
ATTORNEYS

Feb. 26, 1952　　　W. M. SPRENG　　　2,587,240
APPARATUS FOR SPRAYING
Filed Dec. 16, 1948　　　　　　　　　4 Sheets-Sheet 2

INVENTOR
WARREN M. SPRENG
By Toulmin & Toulmin
ATTORNEYS

Feb. 26, 1952 W. M. SPRENG 2,587,240
APPARATUS FOR SPRAYING
Filed Dec. 16, 1948 4 Sheets-Sheet 3

INVENTOR
WARREN M. SPRENG
By Toulmin & Toulmin
ATTORNEYS

Feb. 26, 1952 — W. M. SPRENG — 2,587,240
APPARATUS FOR SPRAYING
Filed Dec. 16, 1948 — 4 Sheets-Sheet 4
Fig. 5
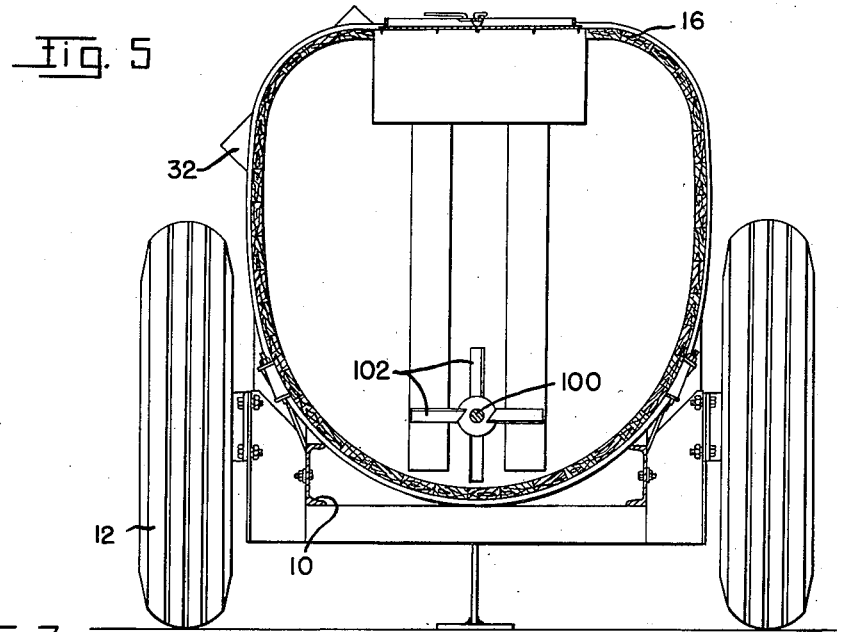
Fig. 7
Fig. 6
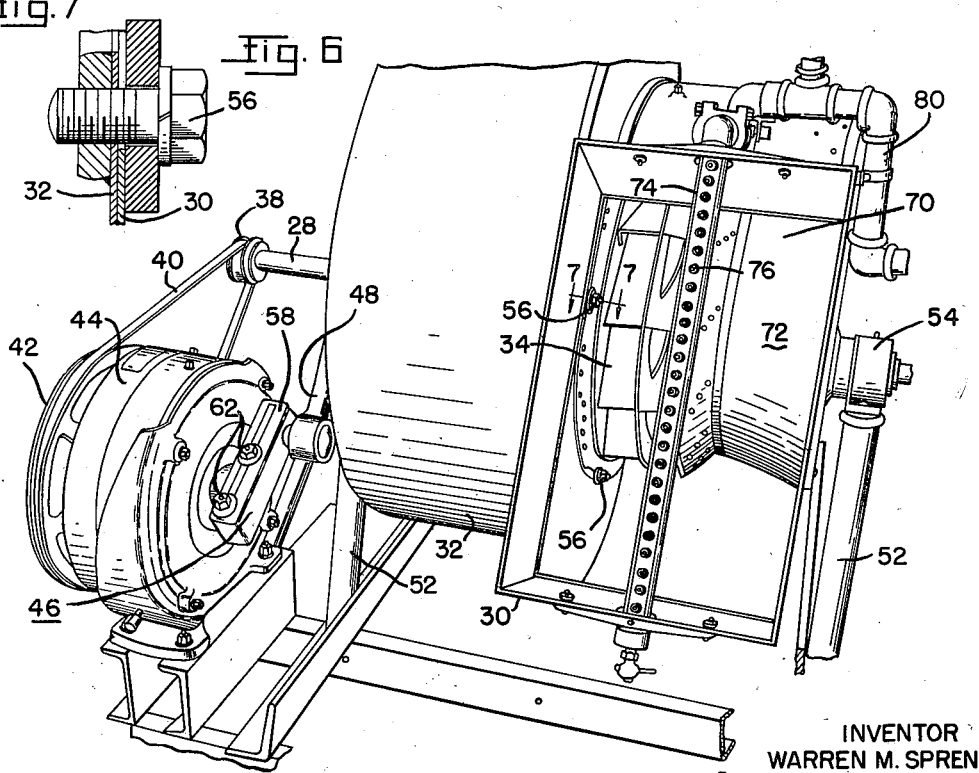
INVENTOR
WARREN M. SPRENG
By Toulmin & Toulmin
ATTORNEYS Patented Feb. 26, 1952

2,587,240

UNITED STATES PATENT OFFICE 2,587,240

APPARATUS FOR SPRAYING

Warren M. Spreng, Ashland, Ohio, assignor to The F. E. Myers & Bro. Co., Ashland, Ohio, a corporation of Ohio Application December 16, 1948, Serial No. 65,561

6 Claims. (Cl. 299—39)

This invention relates to an improved machine for spraying insecticides and fungicides on fruit trees, bushes and ground crops, or for dispensing weed killing chemicals onto ground vegetation. In particular, this invention relates to a spraying machine in which the insecticide or fungicide is air-borne from the machine to the point of application.

In modern practices the spraying of crops is generally carried out over large acreages, and it is important that this be done as economically as possible. Accordingly, it is important to have a spraying or dusting machine which will operate as rapidly as possible and with the smallest amount of attendance. Machines currently employed generally require a driver and at least one or two spray gun operators, and the speed of operation of the machine is much less than necessary to afford economical coverage of large areas.

With machines using spray guns operated by individual operators, the stream from the guns is ordinarily of high pressure, and unless the operators are particularly careful, serious damage to the foliage and fruit can result. Additionally, the mechanism for creating a high pressure fluid which emanates from the gun is relatively expensive, as the guns are also, and the complete machine for doing high pressure spraying is thus of rather high cost.

The present invention proposes to overcome the difficulties referred to above by providing a machine which is much more rapid in operation than machines of the prior art, which is more inexpensive to build and operate, and which does not harm the foliage, fruit or plants being treated by eliminating the high pressure delivery from the machine.

It is a still further object of this invention to provide a spraying machine which will produce a fog of the insecticide or fungicide being applied and thus envelop the foliage and fruit being treated and without harming the said fruit and foliage.

A still further object of this invention is the provision of a spraying arrangement for dispensing liquids which is effective for gently agitating the foliage being sprayed whereby all portions of the said foliage become treated by the said liquid.

It is also an object of this invention to provide a spraying machine for dispensing insecticides and fungicides in liquid form which will require a minimum of attention while in operation and which will operate at a high rate of speed thereby resulting in economical application of the insecticides and fungicides.

A still further object is the provision of a spraying machine which shall be adjustable in order to accommodate it to various types of foliage such as trees and ground foliage and which will also be adjustable in order to adapt it for applying the material to a single row of foliage or to two rows at the same time.

These and other objects and advantages will become more apparent upon reference to the following specification taken in connection with the accompanying drawings in which:

Figure 5 is still another transverse section and is indicated by the line 5—5 on Figure 3.

Figure 6 is a perspective view showing the dual blower arrangement.

Figure 7 is a detailed view indicated by the line 7—7 on Figure 6 and showing the means for attaching the housings of the two blowers together.

Figure 1:
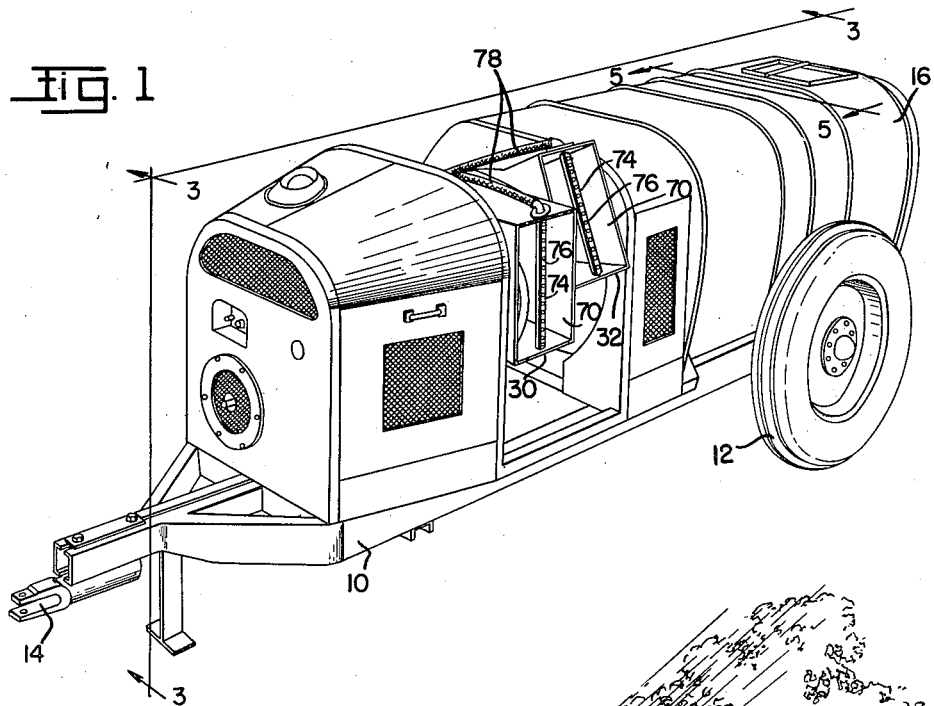
Figure 1 is a perspective view of a spraying machine constructed according to my invention.
Figure 2:
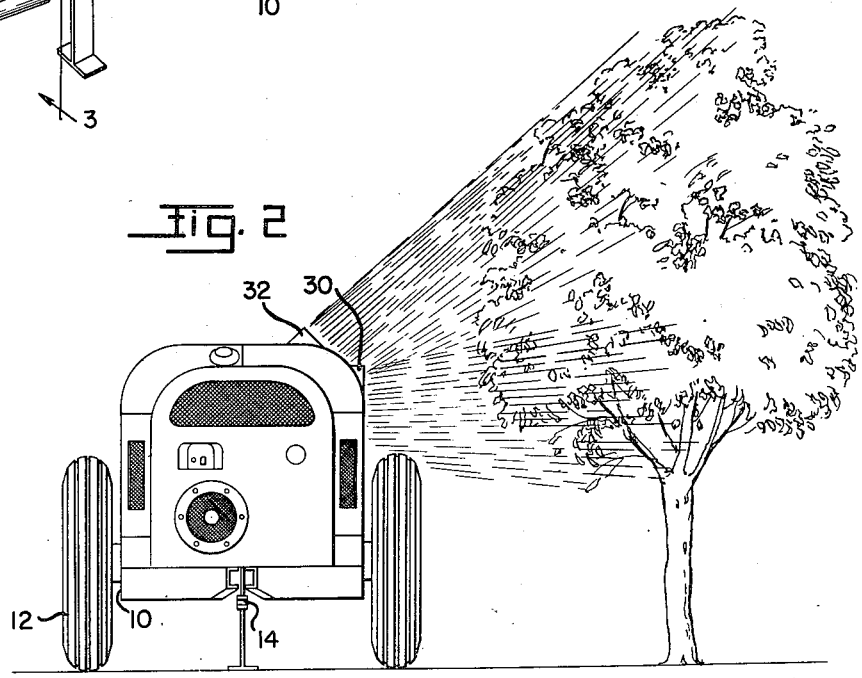
Figure 2 is a front elevational view of the spraying machine showing it in the act of applying spraying material to a tree.

Referring to the drawings somewhat more in detail, the device of this invention preferably comprises a frame 10 having the ground wheels 12. The said frame is adapted for attachment with a tractor or other similar pulling device so that it can be pulled through the orchard or the field which is to be sprayed. To this end, the frame has at its forward end, the hitch mechanism indicated by the reference numeral 14.

Mounted on the back end of the frame 10 is a tank or reservoir 16 into which the material to be dispensed by the machine is placed. As shown, the reservoir or tank 16 is for the purpose of receiving liquid solutions of insecticide or fungicide, but it will be understood that under certain circumstances means could be provided for carrying such materials in other forms.

Figure 3:
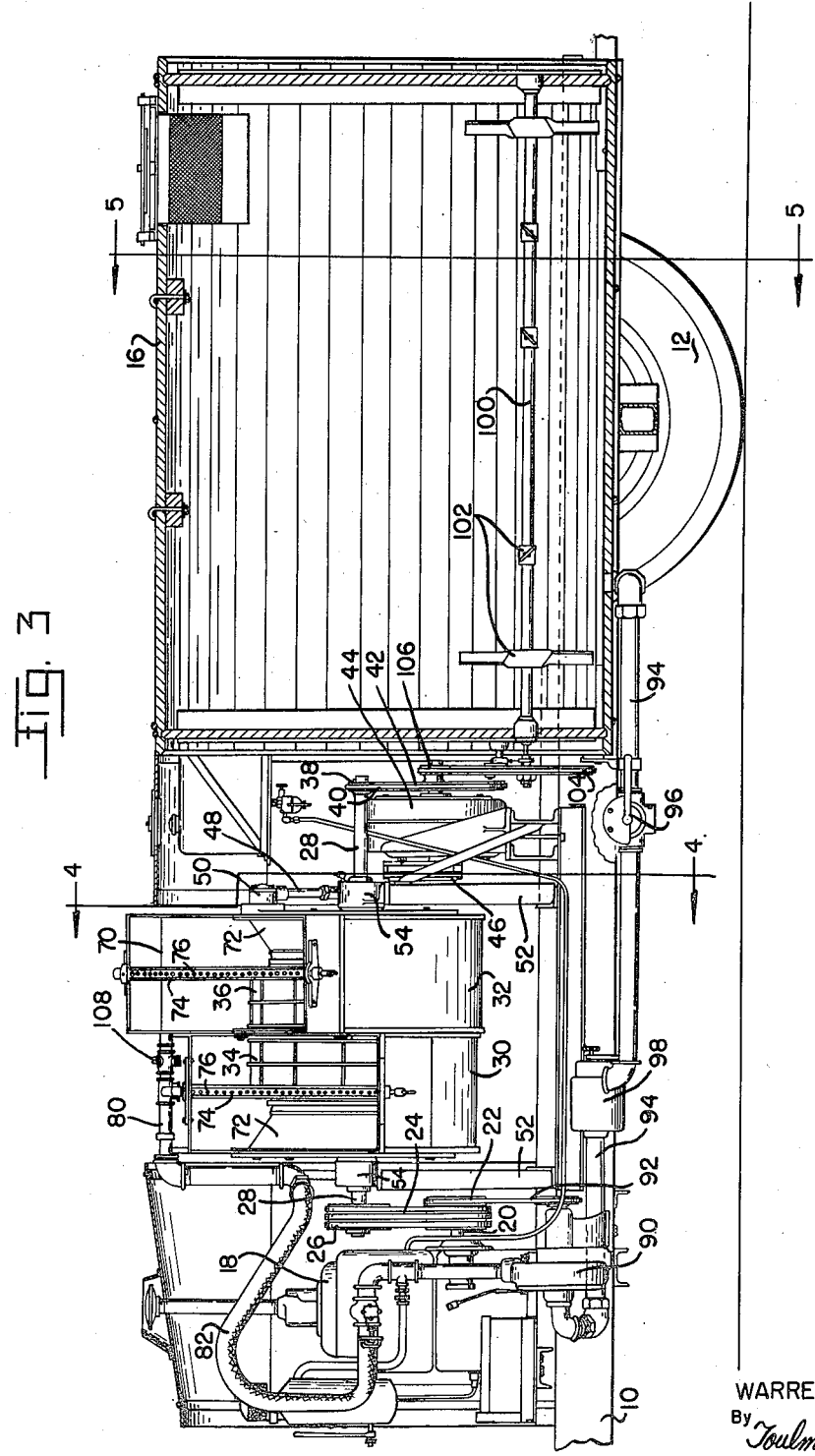
Figure 3 is a vertical longitudinal section taken through the machine showing the construction thereof and may be indicated by the cutting plane 3—3—3 on Figure 1.

At the opposite end of the frame 10 there is a power unit indicated by the reference numeral 18 and which is preferably a suitable engine of the internal combustion type. This engine provides the entire power for the spraying unit, serving to drive the blowers, the agitator in the tank 16 which retains the material therein thoroughly admixed, and also driving the pumping mechanism which conveys the material to be dispensed from the tank 16 to the discharge openings of the blowers. The motor 18 includes an out-put shaft 20 and this shaft 20 carries the pulley arrangement at 22. The pulley arrangement at 22 has passing thereover the V-belts or other driving means 24 and which, in turn, pass over the pulley arrangement at 26 mounted on the end of a shaft 28. The shaft 28 extends completely through the blower units which are indicated at 30 and 32 and has mounted thereon within the blowers the fan impellers 34 and 36. As will be seen in Figure 3, the shaft 28 extends out the right or rear side of the blower units and has mounted thereon a pulley 38 which drives a belt 40 that passes over another pulley 42 on the in-put shaft of a speed reducing mechanism 44.

Figure 4:
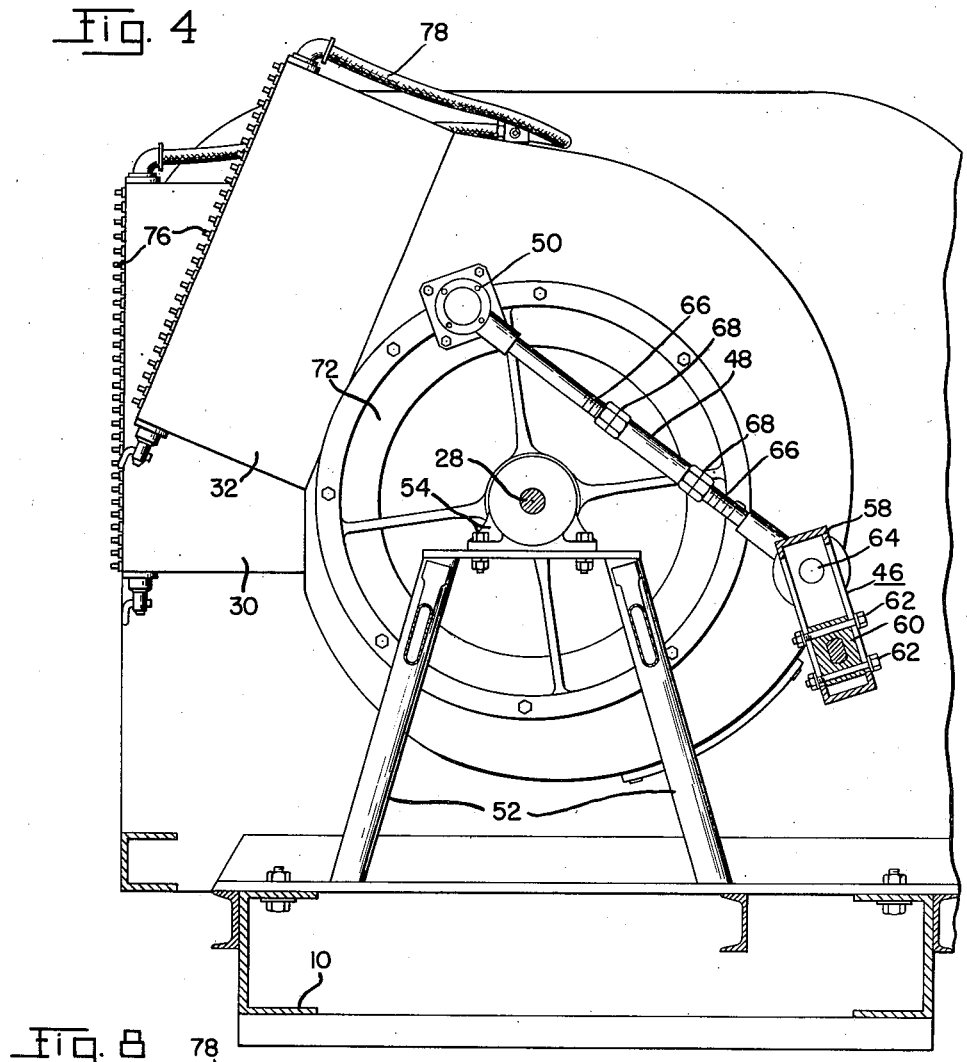
Figure 4 is a transverse section indicating the blower arrangement and the oscillating mechanism therefor and is indicated by the line 4—4 on Figure 3.
Figure 8:
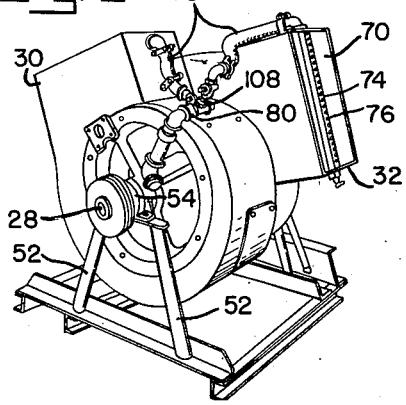
Figure 8 is a perspective view showing the blowers in another position of adjustment and also illustrating the access plate in the back of one thereof for gaining access to the clamping means shown in Figure 7.

The speed reducing mechanism at 44 is for the purpose of causing the blower housings to oscillate, and, accordingly, the unit 44 drives a crank arm 46 which is connected, as will best be seen in Figure 4, by a pitman or drag link 48 with a crank pin on the housing of blower 32 as at 50. It will be apparent that as the engine 18 drives shaft 28 the impellers in the blower housings will rotate while at the same time the blower housings will oscillate about the shaft 28 at a reduced rate of speed. Because of this the blower housings are preferably journaled on the supporting frame 10 as by means of the upstanding brackets at 52 and which carry at their upper ends the bearing blocks 54. These bearing blocks also provide journaling means for the shaft 28.

In order to cause the housings of the blowers to oscillate as a unit, and to maintain them in rigid alignment, they are preferably connected together as indicated in Figures 6 and 7. These figures show the attaching and clamping screws 56 which extend through the blower housings and into suitable retaining rings. These screws form the sole connection between the housings, and it will be apparent that loosening of the screws will permit the housings to be adjusted relatively to each other. The relative adjustment of the housings covers a range of approximately 180 degrees so that the said blowers can be adjusted to discharge in directly opposite directions or can discharge parallel with each other.

The amount of oscillation of the blower housings is adjustable by means of adjustment of the crank arm 46 and the particular angle through which the housings will oscillate can be adjusted by adjusting the length of the drag link 48. Referring to Figure 4 it will be seen that the crank arm 48 comprises a box-like member 58 which is clamped to the block 60 on the out-put shaft of the reducing mechanism 44 by means of the clamp bolts 62. The box-like member 58 is slotted and by loosening the bolts 62 it can be adjusted in order to adjust the distance between the center of the crank pin 64 at the crank arm end of the pitman and the center of the out-put shaft of the reducing mechanism. Preferably, this adjustment will at least accommodate changes of oscillation of the blower housings from 20 degrees to about 90 degrees. It will be understood, however, that if desired the adjustment of the crank arm could be such that the blower housings would be held against oscillation.

It will also be noted in Figure 4 that the length of drag link 48 can be adjusted as by means of the threaded joints at 66 and the clamping nuts 68 for adjusting the circumferential position of the arc through which the blowers are oscillated.

Referring now to the construction of the blowers, it will be seen that each thereof has a double width outlet. That is, the outlet opening of each of the blowers indicated at 70 is of substantially twice the width of the impeller of the blower. Thus, as air enters the inlet openings of the blowers, these inlets being indicated by the cone-shaped entrances at 72, it is impelled outwardly by the impellers and then issues through the outlet openings as a relatively low velocity air stream and over a relatively wide area. This is in contradistinction to a high pressure, high velocity stream issuing over a relatively small area as in spraying machines of the prior art.

During operation of the machine insecticide or fungicide or the other material to be dispensed is supplied to the air stream by means of the manifolds 74 which are positioned in the blower outlets. These manifolds comprise a plurality of jets 76 opening outwardly in the direction of the air streams issuing from the blowers.

These manifolds are supplied with the material to be dispensed through the flexible conduits 78 which connect with a pipe 80 leading to the discharge side of a pump 90 that is driven by the belt connection with the pulley arrangement 22 as indicated by the reference numeral 92. The inlet side of the pump 90 is connected by a pipe 94 with a port in the tank 16 and draws the material to be dispensed therefrom. There is preferably included in the pipe 94 a shut-off valve 96 and a screening arrangement 98.

The material within the tank 16 is maintained agitated in order to keep it thoroughly admixed by means of an agitator shaft 100 which includes the paddles or propellers 102 and which extends out the front end of the tank 16 and mounts a pulley 104 that is driven from the in-put shaft of the speed reducing device 44 as by means of the pulley 106.

Since the blower housings oscillate, the pipe 80 includes a length of flexible tube 82 which permits free relative movement between the blower housings and the other parts of the spraying machine.

*Operation*

The machine of this invention is placed in operation by placing the material to be dispensed in the tank 16.

The engine 18 is then started and the pump 90 will build up a pressure on the manifolds 74 and cause the material being dispensed to issue into the air stream now being blown by the blowers. Assuming that a row of trees is to be sprayed, the blower housings are adjusted both as to relative angularity and to arc of oscillation to provide for the most effective coverage of the said trees.

For example, if tall trees are to be sprayed, it has been found that the blower housings can be locked together at an angle of about 25 degrees from each other, and the lower fan will direct spraying material into the bottom of the tree while the other fan directs spraying material to the top of the tree. The amount of oscillation of the fan cases at this time can be materially reduced because of the wide angle of spray issuing therefrom. It will be noted that at this time the fog emanating from the blowers has a tendency to agitate the foliage of the tree so that spray material reaches all parts thereof. At the same time, the agitation of the foliage is so gentle that there is no harm done thereto and none of the fruit is knocked from the tree.

If shorter trees are to be sprayed, the blower housings can be set at less angularity to each other and the amount of oscillation thereof is correspondingly reduced.

Figure 9:
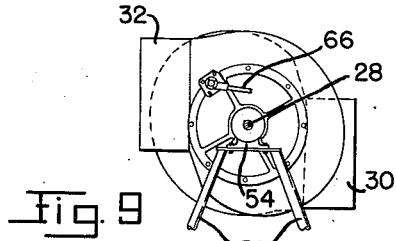
Figure 9 is a view showing the blower housings set for discharge at 180 degrees apart.

If the trees to be sprayed are quite short, it is possible that the blower housings can be set to blow out opposite sides of the machine as indicated in Figure 9, and effective coverage of one side each of two adjacent rows thereby effected. In operating in this manner, it will be noted that the beneficial gentle agitation of the foliage obtained by the applicant's arrangement is still effective in effecting complete coverage of the vegetation being sprayed.

If ground crops or very small bushes are to be sprayed, the blower housings can be adjusted to 180 degrees apart from each other, and the oscillation of the blowers reduced to a minimum so that substantially all of the spraying material is directed toward the ground.

In connection with reversing the one blower housing in order to cause it to discharge at 180 degrees from the other thereof, it is preferable to remove the manifold from the housing to be reversed, and to reverse the said manifold in the discharge opening of the blower. This permits the same flexible conduits 78 to be employed for all positions of operation of the blower housings.

In some instances it may be desirable to supply spray material to only one of the manifolds 74, and to this end, there may be included a shut-off valve 108 in the pipe leading to the manifold furthest from the pump 90.

It will be understood that the angles of oscillation of the blowers and the adjustability thereof relative to each other referred to in the foregoing are merely exemplary of the many modifications that could be made of this device within the purview of the invention. Accordingly, I do not desire to be limited to the particular arrangement shown and described and to the particular degrees of adjustability thereof set forth, but desire to comprehend such modifications and alterations as may be held to come within the scope of the appended claims.

I claim:

1. In a spraying machine: a pair of adjacently arranged axially aligned blowers each having a housing with a peripheral discharge opening, means for clamping the said housings together in any predetermined position of relative angularity of a plane parallel to the direction of discharge therefrom, means for oscillating said housings as a unit about their axis for varying the vertical angle of discharge therefrom, and means for suplying insecticide or fungicide to the outlets of said blowers to be borne by the air stream therefrom.

2. In a spraying machine; a shaft, a pair of spaced air impellers mounted on said shaft, a housing surrounding each impeller and each housing having a peripheral outlet, said housings being journaled for oscillating movement about said shaft, means adjustably clamping said housings together for predetermining the angle between the outlets thereof, means driven by said shaft and connected with one of said housings for oscillating the housings as a unit during the rotation of said shaft, and means for supplying material to be sprayed to the air streams emanating from said outlets.

3. In a spraying machine; a frame, a blower shaft journaled on a horizontal axis in said frame, a pair of spaced air impellers mounted on said shaft, a blower housing surrounding each impeller and each housing having a peripheral discharge opening, said housings being journaled for oscillating movement about the axis of said shaft, means adjustably securing said housings together to predetermine the angle between the outlets thereof, adjustable means connected with one of said housings for causing oscillation of the housings as a unit, means for driving said last mentioned means from the said blower shaft, and means for supplying material to be sprayed to the outlet openings of said blowers to be borne by the air streams therefrom.

4. In a spraying machine; a portable frame having ground wheels, a blower shaft journaled on a horizontal axis extending lengthwise of said machine, a pair of spaced air impellers mounted on said shaft to be driven thereby, a blower housing having a tangential discharge opening surrounding each of said impellers and each of said housings being journaled for rotary movement about the axis of said shaft, said housings abutting and means adjustably connecting said housings together to predetermine the angle between the outlets thereof, a rotary crank arm journaled in said frame and being connected with one of said housings whereby rotary movement of said arm will produce oscillating movements of said housings as a unit, a reducing drive means connecting said shaft with said crank arm, motor means for driving said shaft, and means for supplying the material to be sprayed to the outlets of said housings to be borne by the air streams issuing therefrom.

5. In a spraying machine; a portable frame having ground wheels, a pair of blower housings having tangential discharge openings said housings being aligned and adjustably secured together on an axis extending horizontally and lengthwise of said machine, said housings being journaled on said axis for rotary movement in a vertical plane, a blower shaft extending completely through said housings and journaled independently thereof on the same axis for rotary movement, an impeller on said shaft within each of said housings, a variable throw crank journaled in said frame and connected with said housings for oscillating the same in a vertical plane, means for driving said variable crank arm by said shaft, a tank on said frame containing material to be dispensed, an agitator in said tank and driving means for said agitator connected with said shaft, and means including a pump for conveying material from said tank to the discharge openings of said housings.

6. In a spraying machine; a mobile frame having ground wheels, a blower shaft journaled on a horizontal axis extending lengthwise of said frame, a pair of air impellers mounted on said shaft to be driven thereby, a blower housing surrounding each impeller and each housing having an axial inlet and a tangential discharge opening, said housings abutting on their adjacent sides and having adjustable clamping means for retaining them in any position of angular adjustment, means journaling said housings for oscillation as a unit about the axis of said shaft, a drag link connected with one of said housings for oscillating said housings as a unit, an adjustable throw crank arm connected with said drag link, a speed reducer connected for driving said crank arm, means for driving said speed reducer from said blower shaft, a spraying material tank mounted on said frame and having an agitator therein, means for driving said agitator from the shaft of said speed reducer, a motor for driving said blower shaft, a pump for conveying spraying material from said tank to the outlets of said blowers, and means for driving said pump by said motor.

WARREN M. SPRENG.

REFERENCES CITED

The following references are of record in the file of this patent:

UNITED STATES PATENTS

| Number | Name | Date |
|---|---|---|
| 1,652,732 | Root | Dec. 13, 1927 |
| 1,783,430 | Johnson | Dec. 2, 1930 |
| 1,998,856 | Towt | Apr. 23, 1935 |
| 2,220,082 | Daugherty | Nov. 5, 1940 |
| 2,231,454 | Saxe | Feb. 11, 1941 |
| 2,238,120 | Launder | Apr. 15, 1941 |
| 2,374,955 | Raper | May 1, 1945 |
| 2,423,008 | Daugherty | June 24, 1947 |
| 2,429,374 | Shade | Oct. 21, 1947 |
| 2,551,789 | Copley | May 8, 1951 |

FOREIGN PATENTS

| Number | Country | Date |
|---|---|---|
| 122,941 | Great Britain | Feb. 13, 1919 |